United States Patent
Shalom et al.

(10) Patent No.: US 12,277,068 B2
(45) Date of Patent: Apr. 15, 2025

(54) ADAPTIVE CONFIGURATION OF ADDRESS TRANSLATION CACHE

(71) Applicant: MELLANOX TECHNOLOGIES, LTD., Yokneam (IL)

(72) Inventors: Gal Shalom, Givat Avni (IL); Daniel Marcovitch, Yokneam Illit (IL); Ran Avraham Koren, Haifa (IL); Amir Sharaffy, Sderot (IL); Shay Aisman, Zichron Yaakov (IL); Ariel Shahar, Jerusalem (IL)

(73) Assignee: Mellanox Technologies, Ltd, Yokneam (IL)

( * ) Notice: Subject to any disclaimer, the term of this patent is extended or adjusted under 35 U.S.C. 154(b) by 59 days.

(21) Appl. No.: 18/299,732

(22) Filed: Apr. 13, 2023

(65) Prior Publication Data

US 2024/0345963 A1 Oct. 17, 2024

(51) Int. Cl.
  *G06F 12/00* (2006.01)
  *G06F 12/0811* (2016.01)
  *G06F 12/0891* (2016.01)
  *G06F 12/1027* (2016.01)

(52) U.S. Cl.
  CPC ...... *G06F 12/1027* (2013.01); *G06F 12/0811* (2013.01); *G06F 12/0891* (2013.01); *G06F 2212/1021* (2013.01)

(58) Field of Classification Search
  None
  See application file for complete search history.

(56) References Cited

U.S. PATENT DOCUMENTS

| | | | |
|---|---|---|---|
| 9,298,642 | B2 | 3/2016 | Kagan et al. |
| 9,632,901 | B2 | 4/2017 | Raikin et al. |
| 9,639,487 | B1 | 5/2017 | Wentzlaff et al. |
| 9,648,081 | B2 | 5/2017 | Raikin et al. |
| 9,996,498 | B2 | 6/2018 | Shahar et al. |
| 10,031,857 | B2 | 7/2018 | Menachem et al. |
| 10,120,832 | B2 | 11/2018 | Raindel et al. |
| 10,367,741 | B1 | 7/2019 | Ramey et al. |
| 10,789,175 | B2 | 9/2020 | Tal et al. |
| 11,502,912 | B2 | 11/2022 | Levy et al. |
| 11,620,245 | B2 | 4/2023 | Oved et al. |
| 2011/0083064 | A1 | 4/2011 | Kagan et al. |

(Continued)

OTHER PUBLICATIONS

PCI-SIG, "PCI Express® Base Specification Revision 5.0," version 1.0, chapter 10, pp. 1169-1209, May 22, 2019.

(Continued)

*Primary Examiner* — Daniel D Tsui
(74) *Attorney, Agent, or Firm* — Meitar Patents Ltd.; Daniel Kligler

(57) ABSTRACT

A peripheral device includes a bus interface and an Address Translation Service (ATS) controller. The bus interface is to communicate over a peripheral bus. The ATS controller is to communicate over the peripheral bus, including sending address translation requests and receiving address translations in response to the address translation requests, to cache at least some of the address translations in one or more Address Translation Caches (ATCs), to estimate one or more statistical properties of the received address translations, and to configure the one or more ATCs based on the one or more statistical properties.

20 Claims, 2 Drawing Sheets

(56) References Cited

U.S. PATENT DOCUMENTS

| | | |
|---|---|---|
| 2013/0315237 A1 | 11/2013 | Kagan et al. |
| 2014/0089450 A1 | 3/2014 | Raindel et al. |
| 2014/0089528 A1 | 3/2014 | Bloch et al. |
| 2014/0122828 A1 | 5/2014 | Kagan et al. |
| 2020/0278935 A1* | 9/2020 | Borikar .................. G06F 12/12 |
| 2023/0409487 A1* | 12/2023 | Sandberg ............ G06F 12/0802 |

OTHER PUBLICATIONS

PCI-SIG, "PCI Express® Base Specification Revision 6.0," version 1.0, published document, pp. 1-1923, Dec. 16, 2021.
CXL Consortium, "CXL™ Consortium Releases Compute Express Link ™ 2.0 Specification", Press Release, pp. 1-2, Nov. 10, 2020.
NVIDIA Corporation, "NVIDIA Opens NVLink for Custom Silicon Integration", Press release, pp. 1-2, Mar. 22, 2022.
Marcovitch et al., U.S. Appl. No. 18/353,123, filed Jul. 17, 2023.

* cited by examiner

ADAPTIVE CONFIGURATION OF ADDRESS TRANSLATION CACHE

FIELD OF THE INVENTION

The present invention relates generally to computer peripheral devices, and particularly to Address Translation Caching (ATC).

BACKGROUND OF THE INVENTION

Various computing systems comprise peripheral devices, e.g., network interface controllers, storage devices and graphics accelerators, which communicate with their host over a peripheral bus such as the Peripheral Component Interconnect express (PCIe) bus. PCIe is specified, for example, in "PCI Express Base Specification Revision 6.0," version 1.0, Jan. 11, 2022.

In a virtualized environment, e.g., when using Single-Root Input-Output Virtualization (SR-IOV), a peripheral device typically runs one or more virtualized devices that access the host memory using virtual addresses. The host runs an Input-Output Memory Management Unit (IOMMU) that translates the virtual addresses into physical addresses (also referred to as "machine addresses") in the host memory.

The PCIe protocol supports an Address Translation Service (ATS) that allows peripheral devices to query the IOMMU for address translations, and to cache address translations in an Address Translation Cache (ATC). The ATS and ATC mechanisms reduce latency, increase bandwidth, and prevent the IOMMU from becoming a performance bottleneck. ATS and ATC are specified, for example, in Chapter 10 of the PCIe Base Specification, cited above.

SUMMARY OF THE INVENTION

An embodiment of the present invention that is described herein provides a peripheral device including a bus interface and an Address Translation Service (ATS) controller. The bus interface is to communicate over a peripheral bus. The ATS controller is to communicate over the peripheral bus, including sending address translation requests and receiving address translations in response to the address translation requests, to cache at least some of the address translations in one or more Address Translation Caches (ATCs), to estimate one or more statistical properties of the received address translations, and to configure the one or more ATCs based on the one or more statistical properties.

In some embodiments, the peripheral device further includes memory-access circuitry, to perform memory access operations over the peripheral bus using the cached address translations.

In some embodiments, the received address translations specify (i) respective translations between first and second address spaces, and (ii) respective page sizes associated with the translations, and the ATS controller is to estimate the one or more statistical properties over the page sizes specified in the address translations, and, in response, to configure the page sizes of one or more of the ATCs.

In an example embodiment, the ATS controller is to identify, within at least a specified subset of the responses, one page or more sizes that occur most frequently in the received address translations, and to set the page sizes of the one or more of the ATCs to match the one or more page sizes that occur most frequently.

In a disclosed embodiment, the ATS controller is to reconfigure a target ATC by (i) temporarily disabling the target ATC, (ii) invalidating the address translations cached in the target ATC, (iii) reconfiguring the page size of the target ATC, and (iv) re-enabling the target ATC. In another embodiment, the ATS controller is to reconfigure a target ATC from a first page size to a second page size by (i) initializing a mediation ATC with the second page size, (ii) during a transition time period, looking-up invalidating existing address translations, having the first page size, in the target ATC, but caching new address translations in the mediation ATC, and (iii) after the transition time period, reassigning the mediation ATC to serve as the target ATC.

Additionally or alternatively, the ATS controller is to configure a total memory size of one or more of the ATCs. In various embodiments, the one or more statistical properties may include one or more of (i) a statistical property indicative of a cache-miss probability for at least one of the one or more ATCs, (ii) a statistical property indicative of an overall address translation handling rate of the one or more ATCs, (iii) a statistical property indicative of a cache-miss probability of another caching mechanism that competes with the one or more ATCs for memory resources, and (iv) a statistical property indicative of utilization of at least one of the ATCs.

In some embodiments, the ATS controller is to cache one or more of the address translations of one or more of the ATCs in a memory that is external to the peripheral device. In some embodiments, the ATS controller is to configure at least one of the ATCs as a hierarchical page table.

There is additionally provided, in accordance with an embodiment that is described herein, a peripheral device including a bus interface and an Address Translation Service (ATS) controller. The bus interface is to communicate over a peripheral bus. The ATS controller is to communicate over the peripheral bus, including sending address translation requests and receiving, in response to the address translation requests, address translations that specify (i) respective translations between first and second address spaces, and (ii) respective page sizes associated with the translations, and to cache at least some of the address translations in an ATC, wherein a given entry of the ATC specifies both a respective translation and a respective page size associated with the translation.

In some embodiments, the ATS controller is to cache in a same ATC (i) a first entry having a first page size, and (ii) a second entry having a second page size different from the first page size.

There is also provided, in accordance with an embodiment that is described herein, a method in a peripheral device. The method includes communicating over a peripheral bus, including sending address translation requests and receiving address translations in response to the address translation requests. At least some of the address translations are cached in one or more Address Translation Caches (ATCs). One or more statistical properties of the received address translations are estimated. The one or more ATCs are configured based on the one or more statistical properties.

The present invention will be more fully understood from the following detailed description of the embodiments thereof, taken together with the drawings in which:

DETAILED DESCRIPTION OF EMBODIMENTS

Overview

Figure 1:
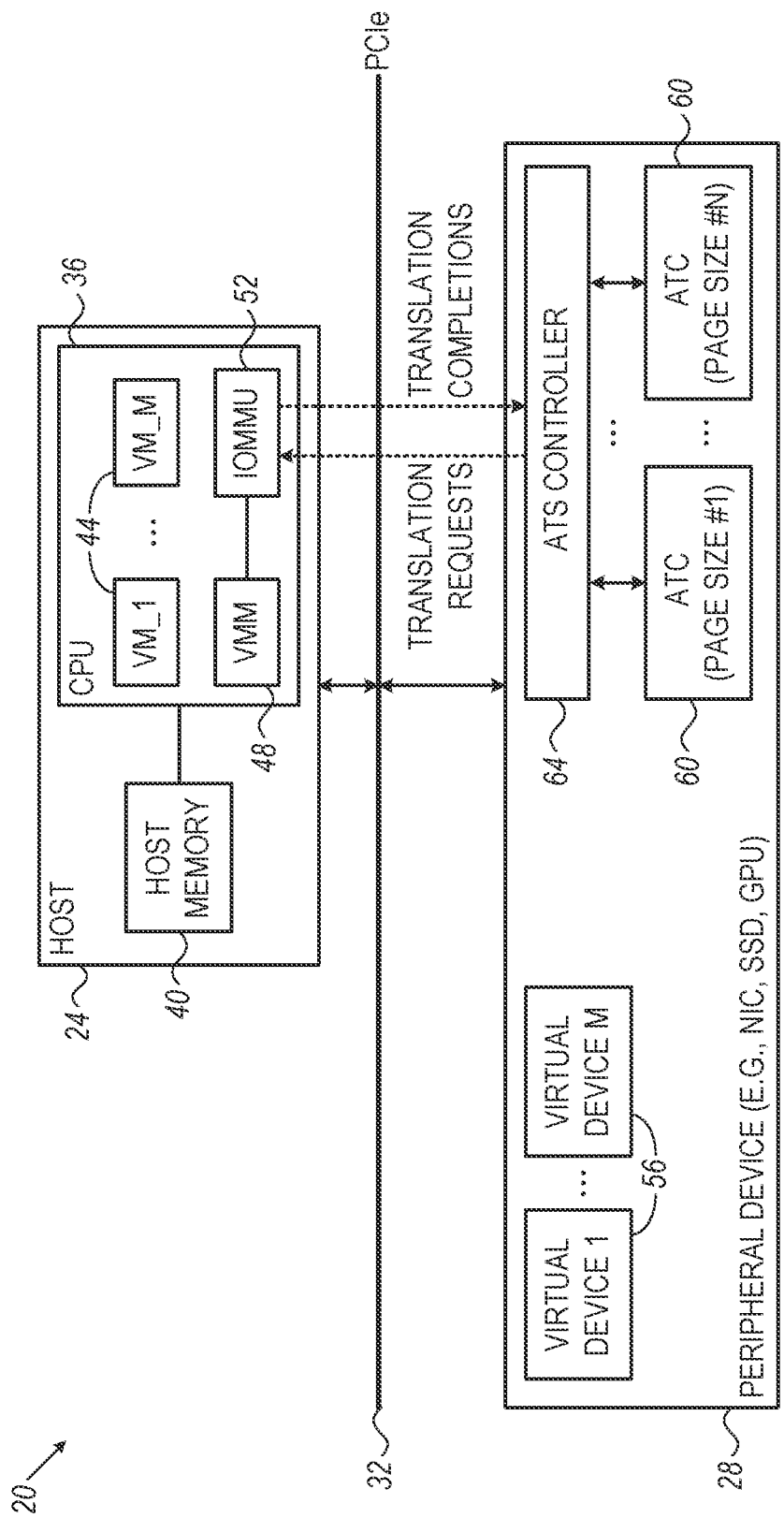
FIG. 1 is a block diagram that schematically illustrates a computing system including a host and a peripheral device that uses an adaptively configurable Address Translation Cache (ATC), in accordance with an embodiment of the present invention.

Embodiments of the present invention that are described herein provide techniques for adaptive configuration of Address Translation Caches (ATCs) in peripheral devices. The disclosed techniques configure ATCs to match the actual characteristics of the address translations being received and cached. In this manner, ATC resources are allocated and used efficiently, and both caching performance and memory-access performance is improved.

In some embodiments, a peripheral device comprises, among other elements, an ATS controller that sends address translation requests to the host, receives from the host translation completions that include the requested address translations, and caches the address translations in one or more ATCs. The ATS controller typically sends the translation requests to, and receives the translation completions from, an IOMMU running in the host. The ATS controller estimates one or more statistical properties of the address translations, and adaptively configures the ATCs based on the statistical properties.

Some of the disclosed techniques adapt the page sizes of the ATCs. In ATS, a given translation completion specifies (i) a physical address corresponding to the virtual address whose translation was requested, and (ii) a page size of the translation. The page size is set by the IOMMU according to some internal policy. The page size may vary from one translation to another, typically at the sole discretion of the IOMMU. The IOMMU may set the page size over a broad range, e.g., from 4K bytes to 1M bytes. In practical scenarios, therefore, the ATS controller may receive a stream of translation completions with varying page sizes, wherein the distribution of page sizes is not known in advance and may change over time.

As can be appreciated, caching such a variable and unpredictable profile of page sizes is extremely challenging. It is possible in principle to cache all address translations in a single ATC having a single page size. With this solution, however, the page sizes of most translations will differ from the page size of the ATC, resulting in a waste of memory resources. Another possible solution is to maintain multiple ATCs, each having a respective fixed page size. This sort of solution is also not optimal. If the number of ATCs is small, the actual page sizes of most translations will differ from the page sizes supported by the ATCs. If the number of ATCs is large, the ATCs will be sparsely populated, causing poor memory utilization.

In some embodiments of the present invention, the ATS controller monitors the received translation completions, and assesses the statistical properties of the actual page sizes that need to be cached. The ATS controller adaptively configures the ATCs at runtime to match the assessed statistical properties of the page sizes. In an example embodiment, the ATS controller maintains a certain number (denoted N, N≥1) of ATCs. The ATS identifies the N page sizes that occur most frequently in the translation completions, and configures the page sizes of the N ATCs to be the N most-frequently-occurring page sizes.

The ATS typically carries out the adaptation process on an ongoing basis during operation of the peripheral device, and in this manner continuously best-matches the page sizes of the ATCs to the actual distribution of page sizes of the address translations. The adaptation process is transparent to the host and does not require any user intervention or configuration. Example techniques for changing the page size of an ATC seamlessly during normal operation are also described herein.

In alternative embodiments, the ATS controller caches address translations having different page sizes in the same ATC. In an example implementation, each entry of the ATC specifies both a respective address translation and a respective page size with associated the address translation.

Other disclosed embodiments adapt the overall memory size of an ATC, or of multiple ATCs. In these embodiments, the ATS controller monitors the received translation completions, and assesses statistical properties such as the cache-miss probability of an ATC, or the overall address translation handling rate of an ATC. Based on the assessed statistical properties, the ATS controller increases or decreases the overall ATC memory size. This technique enables the ATS controller to maintain the desired caching performance, and at the same time release memory resources when possible.

Additional techniques, relating to storing at least part of an ATC in an external memory and to implementing an ATC as a page table, are also described.

The embodiments described herein refer mainly to the Peripheral Component Interconnect express (PCIe) bus, by way of example. The disclosed techniques, however, are applicable to any other suitable peripheral bus, e.g., Compute Express Link (CXL), Nvlink or Nvlink Chip-to-Chip (Nvlink-C2C) buses.

System Description

FIG. 1 is a block diagram that schematically illustrates a computing system 20 including a host 24 and a peripheral device 28 that uses an adaptively configurable Address Translation Cache (ATC), in accordance with an embodiment of the present invention.

Host 24 may comprise, for example, a server, a workstation, or any other suitable computer. Peripheral device 28 may comprise, for example, a network adapter (e.g., an Ethernet Network Interface Controller—NIC—or Infini-Band Host Channel Adapter-HCA), a storage device (e.g., a Solid-State Drive-SSD), a storage accelerator, a graphics accelerator (e.g., a Graphics Processing Unit-GPU), or any other suitable peripheral device. Peripheral device 28 is also referred to herein as "device" for brevity.

Host 24 and device 28 communicate with one another over a peripheral bus. In the present example the peripheral bus comprises a PCIe bus 32. In alternative embodiments, however, any other suitable type of peripheral bus can be used, e.g., CXL, Nvlink or Nvlink-C2C.

Host 24 comprises a Central Processing Unit (CPU) 36 and a host memory 40. Host 24 and peripheral device 28 run a virtualized environment in accordance with SR-IOV. CPU 36 runs one or more Virtual Machines (VMs) 44, in the present example a plurality of VMs denoted MV_1 . . . VM_M. CPU 36 further runs a Virtual Machine Manager (VMM) 48 and an IOMMU 52. VMM 48 is responsible for provisioning and managing VMs 44. IOMMU is responsible for performing address translations between virtual addresses and physical addresses in host memory 40, for DMA operations handled by device 28.

Peripheral device 28 runs one or more virtual devices 56. In the present example device 28 runs M virtual devices, each virtual device 56 serving a respective VM 44. Generally, however, there need not be a one-to-one correspondence between virtual devices 56 and VMs 44. Further alternatively, virtual devices 56 may serve entities other than VMs 44, e.g., software processes running in CPU 36.

The functionality of virtual devices 56 depends on the type of peripheral device 28. For example, when peripheral device 28 is a network adapter that connects host 24 to a network, virtual devices 56 typically comprise Virtual NICs (VNICs). When device 28 is a storage device, virtual devices 56 typically comprise virtual disks (VDISKs).

In a typical SR-IOV scheme, VMM 48 allocates each VM 44 a certain range of physical addresses ("physical address space") in host memory 40. Each VM 44 is also assigned a corresponding range of virtual addresses ("virtual address space"). VMs 44 perform memory access transactions in memory 40, e.g., read and write, using the virtual addresses. For DMA operations handled by device 28, translation between the virtual addresses and the corresponding physical addresses is performed by IOMMU 52.

A virtual device 56 that serves a certain VM 44 may also access the address space of the VM, by using the virtual addresses of the virtual address space of the VM. Typically, a virtual devices 56 access the memory spaces of their respective VMs 44 by issuing Direct Memory Access (DMA) transactions over PCIe bus 32. As part of these transactions, IOMMU 52 translates virtual addresses (in the virtual address spaces of the VMs) into corresponding physical addresses (in host memory 40).

As can be appreciated from the above description, IOMMU 52 may become a performance bottleneck. For example, the rate at which IOMMU 52 is able to provide address translations may determine the overall memory-access throughput of system 20. The latency incurred by IOMMU 52 also affects the overall latency of the DMA transactions.

The impact of the IOMMU performance is particularly severe when using device-to-device communication. Device-to-device communication is a scheme in which system 20 comprises multiple peripheral devices 28, all connected to PCIe bus 32 and served by IOMMU 52, and one device 28 accesses the memory space of another device 28. In such a scheme, the communication path between devices 28 may have far more bandwidth than the communication path via IOMMU 52.

The use of Address Translation Service (ATS) and Address Translation Caching (ATC) is effective in avoiding such scenarios, and generally improves memory-access performance in system 20. Thus, in some embodiments peripheral device 28 further comprises an Address Translation Service (ATS) controller 64 and one or more Address Translation Caches (ATCs) 60. In the present example device 28 comprises multiple ATCs having different page sizes.

In a typical ATS flow, a virtual device 56 issues a DMA transaction that accesses (e.g., reads from or writes to) a certain virtual address. ATS controller 64 checks whether a valid translation of this virtual address into a physical address can be found in ATCs 60. If so, the virtual device 56 is able to complete the DMA transaction using the cached physical address, without involving IOMMU 52. If the desired address translation is not cached in ATCs 60, ATS controller 64 sends a translation request message to IOMMU 52 via PCIe bus 32. IOMMU responds by sending a translation completion message on bus 32. The translation completion message comprises the requested physical address, and a page size corresponding to the translation. ATS controller 64 caches the received address translation in ATCs 60 for future use. ATS controller 64 typically caches the address translation in the ATC 60 whose page size matches the page size indicated in the translation completion.

ATS controller 64 may also receive invalidation requests from IOMMU 52 over PCIe bus 32. An invalidation request instructs the ATS controller to invalidate a certain address translation that is cached in ATCs 60. Upon receiving an invalidation request, ATS controller 64 invalidates the requested address translation in ATCs 60, and sends a completion message over PCIe bus 32 to IOMMU 52.

Among its various tasks, ATS controller 64 adaptively configures ATCs 60 using techniques that are explained in detail below.

The configurations of system 20, host 24 and peripheral device 28, as shown in FIG. 1, are example configurations that are chosen purely for the sake of conceptual clarity. In alternative embodiments, any other suitable system, host and/or peripheral device configuration can be used. Elements that are not necessary for understanding the principles of the present invention, such as various interfaces, addressing circuits, timing and sequencing circuits and debugging circuits, have been omitted from the figures for clarity.

The various elements of system 20, host 24 and peripheral device 28 may be implemented in hardware, e.g., in one or more Application-Specific Integrated Circuits (ASICs) or FPGAs. Additionally or alternatively, elements of system 20, host 24 and/or peripheral device 28 may be implemented using software, or using a combination of hardware and software elements. Memory 40 and ATCs 60 may comprise any suitable type of memory, e.g., one or more Random-Access Memory (RAM) devices.

In some embodiments, CPU 36 and/or ATS controller 64 may be implemented, in part or in full, using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Adaptive Configuration of ATC Page Size

As noted above, each translation completion sent from IOMMU 52 to ATS controller 64 specifies (i) a requested translation of a virtual address into a physical address, and (ii) a page size of the translation. In practice, the page sizes of address translations are set by IOMMU 52 according to some internal policy. Peripheral device 28 typically has no control over this policy, which may vary from one IOMMU to another as well as over time. The possible range of page sizes is very broad, e.g., between 4K bytes and 1M bytes.

ATS controller 32 is therefore required to cache a large number of address translations with varying page sizes, wherein the distribution of page sizes is not known in advance and may change over time. In such an environment, any static configuration of ATCs 60 is bound to be suboptimal.

To address this challenge, in some embodiments ATS controller 64 configures the page sizes of ATCs 60 adaptively, depending on the actual page sizes observed in the translation completions. Page size adaptation may involve, for example, one or more of the following actions:

Creating a new ATC having a new page size that is not currently supported by any of the existing ATCs.

Canceling an ATC having a certain page size, so that this page size will not be supported.

A combination of the two actions above-Changing the page size of a given ATC from one page size to another page size.

Increasing or decreasing the memory size allocated to a certain ATC.

In an example embodiment, the number of ATCs 60 is limited to a maximal number denoted N. ATS controller 64 continuously ensures that, at any given time, the page sizes of the N ATCs match the N page sizes that occur most frequently in the translation completions sent by IOMMU 52. If, for example, one page size becomes rare and another page size becomes frequent, ATS controller 64 may adapt the page sizes of one or more of ATCs 60 to start supporting the frequent page size and/or stop supporting the rare page size.

In the present context, the term "page sizes occurring most frequently" may refer to page sizes that occur most frequently overall, page sizes that occur most frequently during a given time window, page sizes that occur most frequently in a particular transaction type (e.g., READ, WRITE or ATOMIC), page sizes that occur most frequently among the completions whose specified page size does not correspond to any currently active ATC, or page sizes that occur most subject to any other suitable constraint.

In various embodiments, ATS controller 64 may use various techniques for tracking the occurrence frequencies of the various page sizes in the translation completions. In an example embodiment, ATS controller 64 maintain a set of counters, each counter counting the number of address translations of a respective page size. The ATS controller may reset the counters on power-up, periodically, or in response to some defined event.

In an embodiment, in assessing the statistical properties of the page sizes, ATS controller 64 also takes into account the page sizes in invalidation requests that are received from IOMMU 52 over PCIe bus 32.

Figure 2:
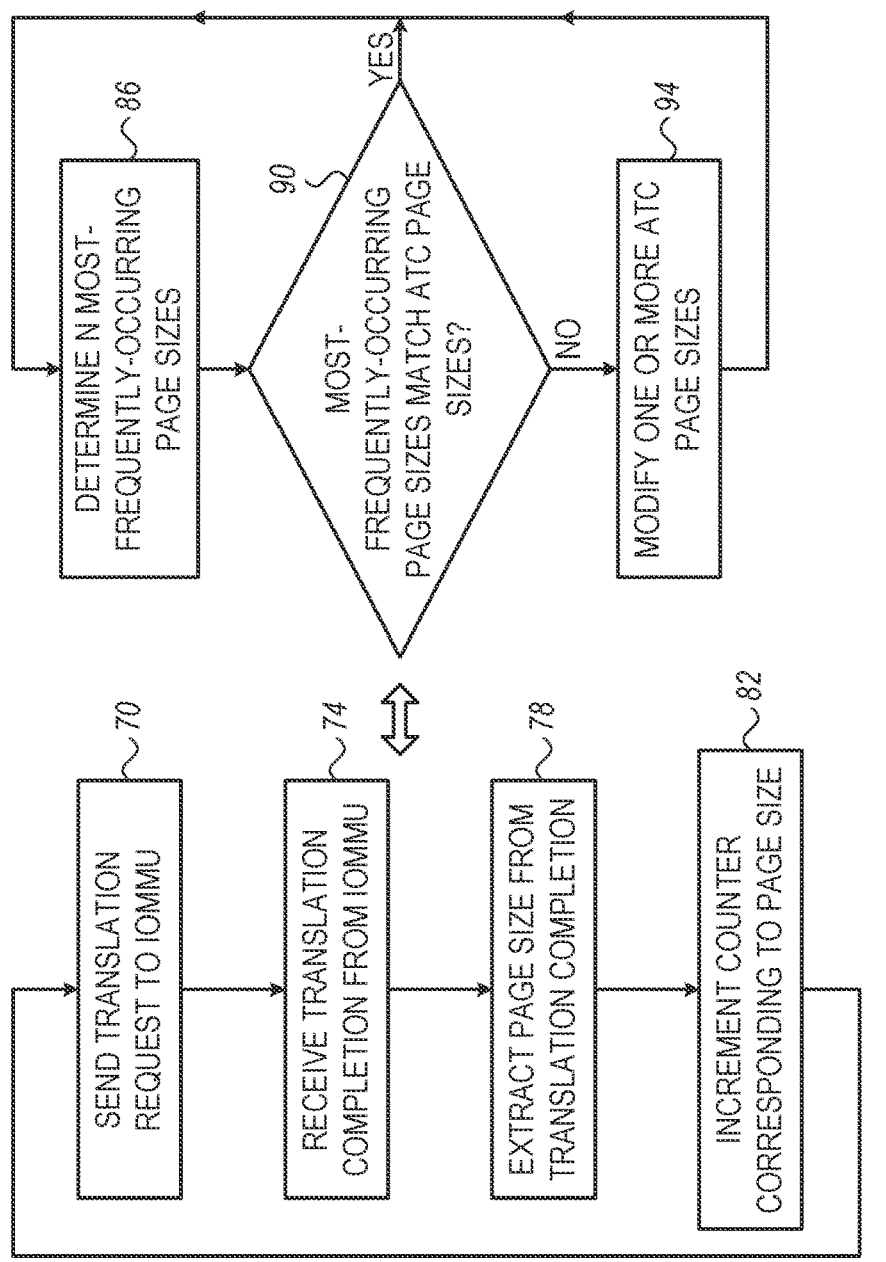
FIG. 2 is a flow chart that schematically illustrates a method for adaptive configuration of ATC page sizes, in accordance with an embodiment of the present invention.

FIG. 2 is a flow chart that schematically illustrates a method for adaptive configuration of ATC page sizes, carried out by ATS controller 64 in accordance with an embodiment of the present invention. In the present example, ATS controller 64 performs two processes in parallel. The process on the left-hand side of FIG. 2 ("tracking process") tracks the occurrence frequencies of the various page sizes using counters. The process on the right-hand side of the figure ("adaptation process") adapts ATC page sizes to match the most-frequently-occurring page sizes.

The tracking process begins with ATS controller 32 sending a translation request to IOMMU 52, at a translation requesting operation 70. At a completion reception operation 74, ATS controller 64 receives a translation completion from IOMMU 52 in response to the translation request.

At a page size extraction operation 78, ATS controller 64 extracts the page size specified in the translation completion. At a counter updating operation 82, ATS controller 64 increments the counter that corresponds to the extracted page size. The method then loops back to operation 70. The tracking process continues throughout the normal operation of ATS controller 64.

The adaptation process begins with ATS controller 64 determining the N page sizes that occur most frequently in the translation completions, at a frequent size identification operation 86. In the present example, ATS controller 64 determines the N most-frequently-occurring page sizes by identifying the N counters having the largest count values.

At a match checking operation 90, ATS controller 64 checks whether the N page sizes that are currently supported by ATCs 60 match the N most-frequently-occurring page sizes. If so, the method loops back to operation 86 above. If not, ATS controller 64 modifies the page size of at least one of ATCs 60, at an adaptation operation 94, so that the N page sizes supported by ATCs 60 will match the N most-frequently-occurring page sizes. The method then loops back to operation 86.

ATS controller 64 typically carries out the adaptation process (right-hand side of the figure) in parallel with the tracking process (left-hand side of the figure). The tracking process affects the adaptation process via the counter values. In an embodiment, ATS controller 64 may perform the adaptation process on an ongoing basis, e.g., periodically. In another embodiment, ATS controller 64 may initiate an iteration of the adaptation process in response to some event, e.g., upon detecting that caching performance (of a certain ATC 60 or of the N ATCs as a whole) degrades below some acceptable level.

The method flow depicted in FIG. 2 is an example flow that is chosen purely for the sake of conceptual clarity. In alternative embodiments, any other suitable method can be used. For example, in some embodiments ATS controller 64 uses the counter values to identify the most commonly-occurring page size that is not associated with any active ATC. The ATS controller may then create a new ATC for this page size.

As another example, in some embodiments, when receiving a translation completion having a page size that is larger than the currently supported ATC page sizes, ATS controller 64 may insert multiple entries into an existing ATC. When using this mechanism, a given ATC entry should also comprise some indication of the original page size specified in the completion (which in this case differs from the page size of the ATC in which the translation is cached). The ATS controller should increment the counter associated with the original page size of the translation.

In various embodiments, ATS controller 64 may use various techniques for changing the page size of a certain ATC (referred to as a "target ATC") among ATCs 60. A change of page size in one ATC is typically independent of the other ATCs, and does not involve disabling or invalidation in other ATCs. As such the plurality of ATCs 60, as a whole, remains active during the adaptation process.

In one embodiment, ATS controller 64 changes the page size of a target ATC by performing the following sequence of operations:

Disable the target ATC from both caching and lookup.

Invalidate the address s translations that are currently cached in the target ATC.

Reconfigure the page size of the target ATC to the new desired page size.

Re-enable the target ATC for caching and lookup.

One limitation of the above scheme is that the ATC in question is disabled while its page size is being reconfigured. In another embodiment, ATS controller 64 changes the page size of a certain ATC 60 while maintaining the ability to cache new translations and look-up cached translations, by temporarily using another ATC as a "mediating ATC". An example scheme of this sort uses the following sequence of operations:

Initialize the mediation ATC to the new page size.

Start a transition period. During the transition period (i) cache new translations in the mediation ATC using the new page size, and (ii) look-up existing translations in the target ATC using the old page size.

When all the translations in the target ATC (which uses the old page size) become invalidated, end the transition period. Reassign the mediation ATC to start serving as the target ATC. Start caching new translations in the new target ATC, using the new page size. The previous target ATC can be re-initialized, e.g., for use as a mediation ATC in the future.

In the schemes described above, each individual ATC 60 has a uniform page size, and multiple page sizes are supported using multiple ATCs. In alternative embodiments, ATS controller 64 manages a single ATC 60 that supports multiple different page sizes. In these embodiments, a given entry of the ATC specifies both the address translation and a respective page size associated with the translation. Different entries of the ATC may specify different page sizes.

Adaptive Configuration of ATC Memory Size

In some embodiments, ATS controller 64 adapts the overall memory size allocated to a given ATC 60 at runtime, based on the statistical properties of the actual translations. In these embodiments, peripheral device 28 typically owns a large memory (within the device or outside the device, as will be discussed below). Parts of this memory are assigned to the various ATCs 60, and possibly to other uses. By adapting the memory size of a given ATC 60, the available memory resources can be used efficiently without compromising caching performance.

ATC size adaptation may involve, for example, one or more of the following actions:

Increasing or decreasing the memory size allocated to a certain ATC 60, regardless of other ATCs 60.

Increasing the memory size allocated to a certain ATC 60, at the expense of another ATC.

Increasing or decreasing the overall memory size allocated to a group of ATCs 60 (e.g., to all ATCs 60), regardless of how the memory is divided among the ATCs in the group.

In various embodiments, ATS controller 64 may adapt the memory size of one or more target ATCs based on various statistical properties. Non-limiting examples of statistical properties that the ATS controller may estimate and use for this purpose include:

A statistical property indicative of the cache-miss probability for at least one of the target ATCs.

A statistical property indicative of the overall address translation handling rate of the target ATCs.

A statistical property indicative of the cache-miss probability of another caching mechanism (not necessarily related to address translation) that competes with the target ATCs for memory resources.

Statistics of Utilization of the entire ATC (or of one or more individual ATCs).

Figure 3:
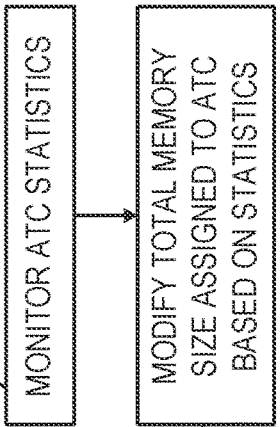
FIG. 3 is a flow chart that schematically illustrates a method for adaptive configuration of total ATC memory size, in accordance with an embodiment of the present invention.

FIG. 3 is a flow chart that schematically illustrates a method for adaptive configuration of total ATC memory size, in accordance with an embodiment of the present invention. The method begins with ATS controller 64 monitoring one or more statistical properties relating to caching in ATCs 60, at a statistics monitoring operation 100. At an adaptation operation 104, ATS controller 64 modifies the memory size allocated to one or more of ATCs 60 based on the monitored statistics.

ATC Backed by External Memory

In some embodiments, the entire memory space used by ATCs 60 resides internally in peripheral device 28. In alternative embodiments, some or all of the memory space used by ATCs 60 may reside externally to peripheral device 28, e.g., in host memory 40. When caching address translations in host memory 40, however, accessing these translations involves communicating over PCIe bus 32. Therefore, the ATC caching and lookup processes should comply with the PCIe bus protocol requirements.

For example, to avoid deadlocks over the PCIe bus, handling of an inbound request should be independent of an outbound non-posted request, since such dependency may cause a deadlock on the entire PCIe interface of peripheral device 28.

Consider, for example, a scenario in which IOMMU 52 issues an ATS Invalidation request to peripheral device 28, requesting device 28 to invalidate one or more cached translations. The invalidation operation requires ATS controller 64 to read from ATC 60. If the readout is performed as a non-posted PCIe read over the same PCIe link used for transferring the invalidation request, the completion (response) of the read is to be ordered behind previous writes from the PCIe root complex to device 28. This order is required because PCIe ordering does not allow PCIe completions to bypass PCIe writes, which in turn may be stuck due to ongoing handling of the original ATS invalidation request, which is pending the completion in order to progress, resulting in a deadlock of the entire PCIe interface.

The above-described deadlock can be avoided in various ways. In one embodiment, ATS controller 64 accesses an ATC residing in host memory 40 through a separate interface (separate from the PCIe interface used for communicating with IOMMU 52). The separate interface may be a PCIe interface or another type of interface (e.g., an interface to a different host, or to the memory subsystem of system 20). The separate interface may alternatively be a PCIe virtual channel (VC) that is different from the VC used for communication with IOMMU 52. In another embodiment, ATS controller 64 stores the ATS invalidation request in internal memory (i.e., in device 28) in order to allow forward progress of the interface.

The external memory holding the ATC should typically be reliable and secure, since the ATC holds actual physical address of the system. The access latency to the external memory should be upper-bounded and small relatively to the round-trip processing time of the translation request and completion between ATS controller 64 and IOMMU 52.

In some embodiments, a portion of the ATCs 60 is stored in external memory (e.g., in host memory 40), and the remaining portion of ATCs 60 is stored in internal memory in device 28. Such a scheme can be implemented as a multi-tier ATC. In some embodiments, one or more ATCs 60 are stored in their entireties in external memory, and the remaining ATCs are stored in their entireties in internal memory. In other embodiments, a given ATC 60 may be split between the external memory and the internal memory.

In one embodiment, the allocation of external memory is static, i.e., a fixed amount of memory in host memory is allocated to ATCs 60. In other embodiments, ATS controller 64 adapts the allocation of external memory at runtime. The adaptation may involve, for example, changing (i) the amount of memory allocated to ATCs 60 in host memory and/or (ii) the selection as to which ATCs and/or which translations of a given ATC, are to be stored in host memory 40.

In one example implementation, a software driver in host 24 is responsible for allocating space in host memory to the ATCs. ATC controller 64 requests host memory resources from the driver as needed, and/or releases host memory resources to the driver when possible. In another possible implementation, the driver on the host allocates host memory resources to a memory management module in device 28. This memory management module is responsible for allocating host memory resources to the ATC, and possibly to other memory consumers in device 28. In this implementation, ATS controller requests host memory resources from the memory management module in device 28, and/or releases host memory resources to the memory management module.

In various embodiments, ATS controller 64 may change the allocation of external memory based on various statistics. Generally, the allocation aims to cache in the external memory (e.g., in host memory 40) translations that are accessed infrequently, and retain frequently-accessed translations in internal memory of the peripheral device.

For example, ATS controller 64 may estimate the access frequencies of individual ATCs and/or of individual translations within an ATC, and decide whether to cache a given ATC or a given translation in internal memory or in external memory. As another example, ATS controller 64 may allocate external memory resources (e.g., in host memory 40) to ATCs of smaller page sizes, which typically require a larger-size ATC due to scale of translations.

Example ATC Formats

In some embodiments, ATS controller 64 caches the address translations in ATCs 60 using a Translation Lookaside Buffer (TLB) format. In this format, each translation is stored as a {virtual address, physical address} pair. For 64-bit addresses, each ATC entry in this format comprises sixteen bytes.

In other embodiments, ATS controller 64 uses a more compact format for caching address translations, by exploiting the fact that the virtual addresses are often arranged in contiguous ranges. In an example embodiment, ATS controller 64 caches address translations using a hierarchical page-table format. The hierarchical format comprises a first hierarchy of large pages, for which the full virtual address is stored. A given large page then points to one or more smaller pages (e.g., as offsets relative to the beginning of the large page). For the smaller pages, there is no need to store the full virtual address. The hierarchical format reduces the ATC size to only eight bytes per translation.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A peripheral device, comprising:
   a bus interface, to communicate over a peripheral bus; and
   an Address Translation Service (ATS) controller, to:
   communicate over the peripheral bus, including sending address translation requests and receiving address translations in response to the address translation requests;
   cache at least some of the address translations in one or more Address Translation Caches (ATCs);
   estimate one or more statistical properties of the received address translations; and
   configure the one or more ATCs based on the one or more statistical properties,
   wherein the received address translations specify (i) respective translations between first and second address spaces, and (ii) respective page sizes associated with the translations, and
   wherein the ATS controller is to estimate the one or more statistical properties over the page sizes specified in the address translations, and, in response, to configure the page sizes of one or more of the ATCs.

2. The peripheral device according to claim 1, further comprising memory-access circuitry, to perform memory access operations over the peripheral bus using the cached address translations.

3. The peripheral device according to claim 1, wherein the ATS controller is to identify, within at least a specified subset of the responses, one or more page sizes that occur most frequently in the received address translations, and to set the page sizes of the one or more of the ATCs to match the one or more page sizes that occur most frequently.

4. The peripheral device according to claim 1, wherein the ATS controller is to reconfigure a target ATC by (i) temporarily disabling the target ATC, (ii) invalidating the address translations cached in the target ATC, (iii) reconfiguring the page size of the target ATC, and (iv) re-enabling the target ATC.

5. The peripheral device according to claim 1, wherein the ATS controller is to reconfigure a target ATC from a first page size to a second page size by:
   initializing a mediation ATC with the second page size;
   during a transition time period, looking-up and invalidating existing address translations, having the first page size, in the target ATC, but caching new address translations in the mediation ATC; and
   after the transition time period, reassigning the mediation ATC to serve as the target ATC.

6. The peripheral device according to claim 1, wherein the ATS controller is to cache one or more of the address translations of one or more of the ATCs in a memory that is external to the peripheral device.

7. The peripheral device according to claim 1, wherein the ATS controller is to configure at least one of the ATCs as a hierarchical page table.

8. A peripheral device, comprising:
   a bus interface, to communicate over a peripheral bus; and
   an Address Translation Service (ATS) controller, to:
   communicate over the peripheral bus, including sending address translation requests and receiving address translations in response to the address translation requests;
   cache at least some of the address translations in one or more Address Translation Caches (ATCs);
   estimate one or more statistical properties of the received address translations; and
   configure a total memory size of one or more of the ATCs based on the one or more statistical properties.

9. The peripheral device according to claim 8, wherein the one or more statistical properties comprise one or more of:
   a statistical property indicative of a cache-miss probability for at least one of the one or more ATCs;
   a statistical property indicative of an overall address translation handling rate of the one or more ATCs;
   a statistical property indicative of a cache-miss probability of another caching mechanism that competes with the one or more ATCs for memory resources; and a statistical property indicative of utilization of at least one of the ATCs.

10. A peripheral device, comprising:
a bus interface, to communicate over a peripheral bus; and
an Address Translation Service (ATS) controller, to:
  communicate over the peripheral bus, including sending address translation requests and receiving, in response to the address translation requests, address translations that specify (i) respective translations between first and second address spaces, and (ii) respective page sizes associated with the translations; and
  cache at least some of the address translations in an ATC, wherein a given entry of the ATC specifies both a respective translation and a respective page size associated with the translation.

11. The peripheral device according to claim 10, wherein the ATS controller is to cache in a same ATC (i) a first entry having a first page size, and (ii) a second entry having a second page size different from the first page size.

12. A method in a peripheral device, the method comprising:
  communicating over a peripheral bus, including sending address translation requests and receiving address translations in response to the address translation requests;
  caching at least some of the address translations in one or more Address Translation Caches (ATCs);
  estimating one or more statistical properties of the received address translations; and
  configuring the one or more ATCs based on the one or more statistical properties,
  wherein the received address translations specify (i) respective translations between first and second address spaces, and (ii) respective page sizes associated with the translations,
  wherein estimating the statistical properties comprises estimating the one or more statistical properties over the page sizes specified in the address translations, and
  wherein configuring the ATCs comprises configuring the page sizes of one or more of the ATCs.

13. The method according to claim 12, further comprising performing memory access operations over the peripheral bus using the cached address translations.

14. The method according to claim 12, wherein estimating the statistical properties comprises identifying, within at least a specified subset of the responses, one or more page sizes that occur most frequently in the received address translations, and wherein configuring the ATCs comprises setting the page sizes of the one or more of the ATCs to match the one or more page sizes that occur most frequently.

15. The method according to claim 12, wherein configuring the ATCs comprises reconfiguring a target ATC by (i) temporarily disabling the target ATC, (ii) invalidating the address translations cached in the target ATC, (iii) reconfiguring the page size of the target ATC, and (iv) re-enabling the target ATC.

16. The method according to claim 12, wherein configuring the ATCs comprises reconfiguring a target ATC from a first page size to a second page size by:
  initializing a mediation ATC with the second page size;
  during a transition time period, looking-up and invalidating existing address translations, having the first page size, in the target ATC, but caching new address translations in the mediation ATC; and
  after the transition time period, reassigning mediation ATC to serve as the target ATC.

17. The method according to claim 12, wherein caching the address translations comprises caching one or more of the address translations of one or more of the ATCs in a memory that is external to the peripheral device.

18. The method according to claim 12, wherein configuring the ATCs comprises configuring at least one of the ATCs as a hierarchical page table.

19. A method in a peripheral device, the method comprising:
  communicating over a peripheral bus, including sending address translation requests and receiving address translations in response to the address translation requests;
  caching at least some of the address translations in one or more Address Translation Caches (ATCs);
  estimating one or more statistical properties of the received address translations; and
  configuring a total memory size of one or more of the ATCs based on the one or more statistical properties.

20. The method according to claim 19, wherein the one or more statistical properties comprise one or more of:
  a statistical property indicative of a cache-miss probability for at least one of the one or more ATCs;
  a statistical property indicative of an overall address translation handling rate of the one or more ATCs;
  a statistical property indicative of a cache-miss probability of another caching mechanism that competes with the one or more ATCs for memory resources; and
  a statistical property indicative of utilization of at least one of the ATCs.

* * * * *